United States Patent
Kerzner et al.

(10) Patent No.: US 10,706,699 B1
(45) Date of Patent: Jul. 7, 2020

(54) PROJECTOR ASSISTED MONITORING SYSTEM

(71) Applicant: Alarm.com Incorporated, Tysons, VA (US)

(72) Inventors: Daniel Todd Kerzner, McLean, VA (US); Gary Franklin Bart, Weston, FL (US); Donald Madden, Tysons, VA (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 117 days.

(21) Appl. No.: 15/977,241

(22) Filed: May 11, 2018

Related U.S. Application Data (60) Provisional application No. 62/507,907, filed on May 18, 2017.

(51) Int. Cl.
| | | |
|---|---|---|
| G09B 19/00 | (2006.01) | |
| G08B 13/196 | (2006.01) | |
| G08B 15/00 | (2006.01) | |
| G06K 9/00 | (2006.01) | |
| G08B 5/22 | (2006.01) | |
| G06T 7/20 | (2017.01) | |
| G06T 7/521 | (2017.01) | |
| H04N 9/31 | (2006.01) | |

(52) U.S. Cl.
CPC ... *G08B 13/19613* (2013.01); *G06K 9/00335* (2013.01); *G06K 9/00771* (2013.01); *G06T 7/20* (2013.01); *G06T 7/521* (2017.01); *G08B 5/22* (2013.01); *G08B 13/19608* (2013.01); *G08B 15/00* (2013.01); *H04N 9/3155* (2013.01); *G06T 2207/30232* (2013.01)

(58) Field of Classification Search
CPC ............ H04N 5/23212; H04N 7/0127; H04N 5/2628; H04N 13/0278; G01B 11/00; G01B 9/08
USPC .............................. 382/103; 345/419; 348/50
See application file for complete search history.

(56) References Cited

U.S. PATENT DOCUMENTS

| | | | |
|---|---|---|---|
| 2006/0146047 A1* | 7/2006 | Marion | H04N 13/30 345/419 |
| 2015/0256764 A1* | 9/2015 | Besson | H04N 5/2628 348/50 |
| 2016/0266577 A1 | 9/2016 | Kerzner | |
| 2016/0267759 A1 | 9/2016 | Kerzner | |

* cited by examiner

*Primary Examiner* — Phuoc H Doan
(74) *Attorney, Agent, or Firm* — Fish & Richardson P.C.

(57) ABSTRACT

A computer-implemented method includes receiving a sample image of an area of a property, identifying a moving object from the sample image, determining a site in the property based on the identified moving object, determining an optical pattern to project at the site based on the identified moving object, and transmitting an instruction to a projector to project the determined optical pattern at the determined site.

19 Claims, 7 Drawing Sheets

FIG. 7 ured and bent corresponding to the geometry of the areas.

PROJECTOR ASSISTED MONITORING SYSTEM

CROSS REFERENCE TO RELATED APPLICATIONS

This application claims benefit of U.S. Provisional Application No. 62/507,607, filed on May 18, 2017, and titled "Projector Assisted Monitoring System," which is incorporated by reference in its entirety.

TECHNICAL FIELD

This disclosure relates to monitoring technology using a light projecting device.

BACKGROUND

Security and surveillance systems have been utilized for years for both residential and commercial properties. Such systems may utilize a central monitoring system to detect when an alleged intrusion has occurred. For instance, the central monitoring system may be alerted when a motion sensor that has been mounted at a particular portion of the property detects motion. In some instances, the central monitoring system may transmit an alert to an operator's call center, or local law enforcement, that indicates that there may be a break-in at the property from which the alert originated.

SUMMARY

Techniques are described for enhancing a monitoring system using a light projection device. In some implementations, the monitoring system may detect a potential intruder within a monitoring area of a property, project an optical pattern at a site of the property near the intruder, and track the intruder in order to deter the intruder from proceeding with a home invasion. In the same, or other implementations, the monitoring system may control one or more projectors to provide an optical pattern in order to guide a known user to a target site in the property.

The details of one or more implementations are set forth in the accompanying drawings and the description below.

DESCRIPTION OF DRAWINGS

Like reference symbols in the various drawings indicate like elements.

DETAILED DESCRIPTION

Techniques are described for enhancing a monitoring system using light projecting devices (e.g. laser projectors, Digital Light Processor (DLP) projectors, Liquid Crystal Display (LCD) projectors, etc). For instance, a monitoring system can detect a moving object or an alarm event by analyzing images or videos captured through cameras of the monitoring system and may instruct one or more projectors to project optical patterns (e.g., points, shapes, texts, graphics, etc.) onto a surface such as a ground of the property or onto the object. The projectors may coordinate with the cameras in order to accurately track a moving object and project optical patterns based on a location of the moving object. Each projector may be capable of displaying multiple different types of optical patterns and projecting the optical patterns with a laser, focused light, infrared light, flood light, and other lighting sources. In some implementations, the projecting device may be integrated within the camera and in other implementations, the projecting device may be separate from the camera.

Figure 1A:
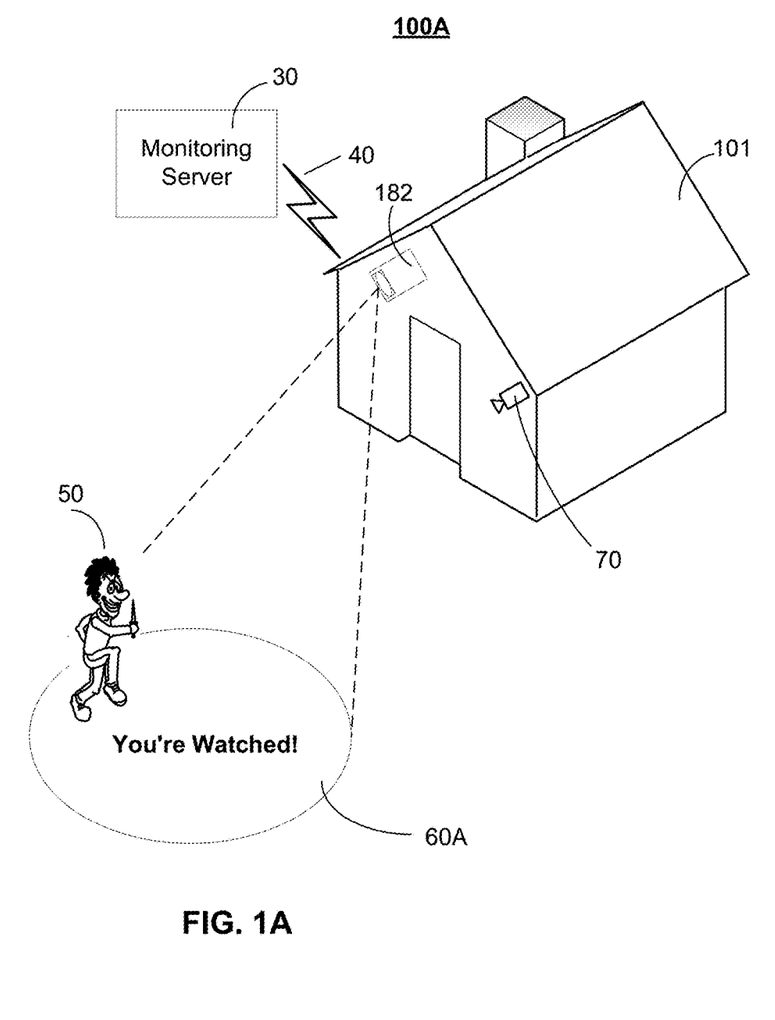
FIGS. 1A-1B illustrate contextual diagrams of an example system for projector assisted monitoring.
Figure 1B:
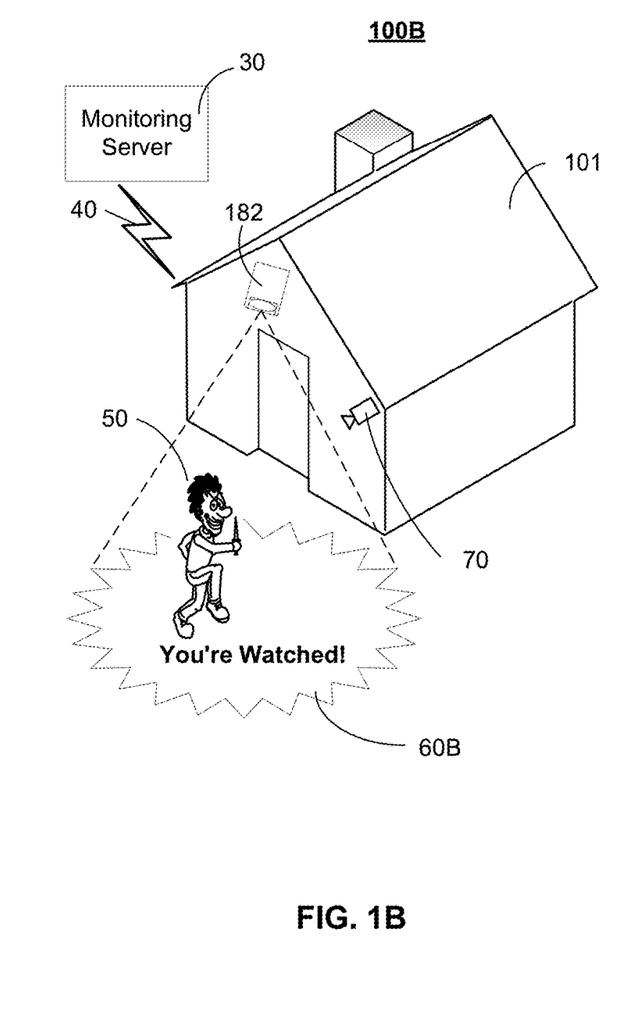

FIGS. 1A-1B illustrate contextual diagrams of an example system for projector assisted monitoring. As shown in FIGS. 1A-1B, a property 101 (e.g., a house) is monitored by a system (e.g., in-home security system) that includes a monitoring server 30, a camera 70, and a projector 182. The system 100A-100B may track a location of a potential intruder and deter the potential intruder by projecting an optical pattern around the potential intruder as the potential intruder moves around, alerting the potential intruder that they have been detected by the system 100 and are being watched.

The monitoring server 30 communicates with the camera 70 and the projector 182 through a communication link 40.

In this example, the camera 70 can view various areas 60A and 60B outside the property to monitor events (e.g., security breach) and a moving object 50 that can be a potential threat (e.g. intruder, burglar, animal, etc.). The projector 182 can project multiple different types of optical patterns at a site at the property 101.

Referring to FIG. 1A, the monitoring server 30 monitors the property 101 by collecting and analyzing images of the property 101 captured by the camera 70 to detect a moving object 50. For example, the monitoring server 30 may perform object recognition on a stream of images and recognize that the streaming images show a person moving around. In some implementations, in detecting a moving object the monitoring server 30 may also classify a moving object. For example, the monitoring server 30 may determine that the moving object 50 is a potential intruder based on video analytics (e.g. face recognition) by comparing images of the moving object 50 with data available to the monitoring server 30 such as family members' appearance, known visitors' appearances, criminal records, or police reports. In some examples, the monitoring server 30 may identify the moving object 50 as a potential intruder based on its behavior or method of approach to the property 101 captured by the camera 70.

In some implementations, the projector 182 may assist in identifying an event or a moving object at the property 101 in conjunction with the camera 70. For instance, while setting up or calibrating the camera 70 with the projector 182, the projector 182 may project a reference optical pattern such as dots, lines, and grids at various areas of the property 101. For example, the monitoring server 30 may project a grid pattern as a reference pattern on to various locations in the property. A grid pattern projected on a flat wall may show straight lines crossing each other while grid patterns projected on curved surfaces and corners may be The camera then captures images of the various areas that may contain the reference optical pattern.

The monitoring server 30 can determine coverage areas or an area map of the property 101 based on existence and deformation of the reference pattern in the images. For example, in some cases, the grid pattern may exist in the images captured by a first camera, but not in other images captured by a second camera. By analyzing the existence and deformation of the reference pattern in the images, the monitoring server 30 may establish an overall pre-map of the property 101. The deformation may be determined by comparing distances between the grids and curvatures of the grids, for instance.

By repeating these processes described above with multiple images of various areas of the property 101, the monitoring server 30 may be able to build an overall three-dimensional image map of the property 101 based on two-dimensional images of the property 101. This process may be performed in the background to keep the system up to date with a current area map. Although FIG. 1 illustrates one property with an outdoor camera and an outdoor projector for brevity, the pre-mapping can be done in the similar ways with multiple cameras and/or multiple projectors. Indoor areas (e.g. rooms and floors) may be monitored by the monitoring server 30 with cameras and projectors that are installed inside the property 101.

The monitoring server 30 may continuously project the reference optical pattern or a portion of the reference pattern onto areas around the property 101 and receive sample images of the areas to detect an event or a moving object 50. The monitoring server 30 may determine a moving object 50 from the sample images by comparing the reference pattern in the sample images with the reference pattern in the pre-map that the monitoring server 30 has established during the camera/projector calibration. For instance, if an object is in the way of the projection path, the reference pattern in the sample image may be deformed because the light is blocked or diffracted by the object. Likewise, when an object passes through or crosses the reference pattern, the monitoring server 30 may recognize the moving object 50. Once detecting the moving object 50, the monitoring server 30 may determine that the moving may be a potential threat based on data available to the monitoring server 30 such as time of day, appearance of the moving object, movement of the moving object, and historic surveillance data.

Based on determining that the moving object 50 may be a potential threat to the property 101, the monitoring server 30 may determine an area or site of the property 101 on which the projector 182 will project an optical pattern in order to deter the moving object 50 from proceeding with a home invasion. For example, the area or site may be the area where the moving object 50 stands, an area in front of the moving object 50, a wall of the property 101, or the moving object 50 itself. The optical pattern to project can be a shape that surrounds the moving object 50, for example, an oval with the words "You're Monitored" or a shape that is projected along an expected path of the moving objects 50, for example, the text "This house is under surveillance" projected where the moving object 50 is next expected to move.

In some cases, the optical pattern may include information related to the moving object 50 based on video analytics such as estimated height and weight, visual appearances (e.g. hair styles and clothes), photography, and video of the moving object 50. In some examples, the optical pattern may be projected on a wall or a roof of the property 101 to alert neighbors or to aid authorities finding the property 101. In some examples, alert sounds may go off together with the optical patterns.

Regarding FIG. 1B, the monitoring server 30 may transmit an instruction to the projector 182 to track the moving object 50 that has been identified as a potential threat. For example, as the moving object 50 moves from the area 60A (see FIG. 1A) to 60B that is closer to the property 101, the monitoring server 30 tracks of movement of the moving object 50 based on the images captured through the camera 70. In some implementations, as described above, the monitoring server 30 may determine a current location 60B of the moving object 50 based on deformation or a change of the reference optical pattern from the pre-map data of the property 101. In some examples, the projector 182 may project different types of optical pattern according to a preset rule as the moving object 50 approaches closer to the property 101. The preset rule for lighting may be set based on various factors such as an arming status of the monitoring system of the property 101, current time of day, and a distance of the moving object 50 from the property 101. For examples, the projected light may be more focused onto the moving object 50 with a higher intensity in blinking shapes during the day as the moving object 50 approaches closer to the property 101.

Figure 2:
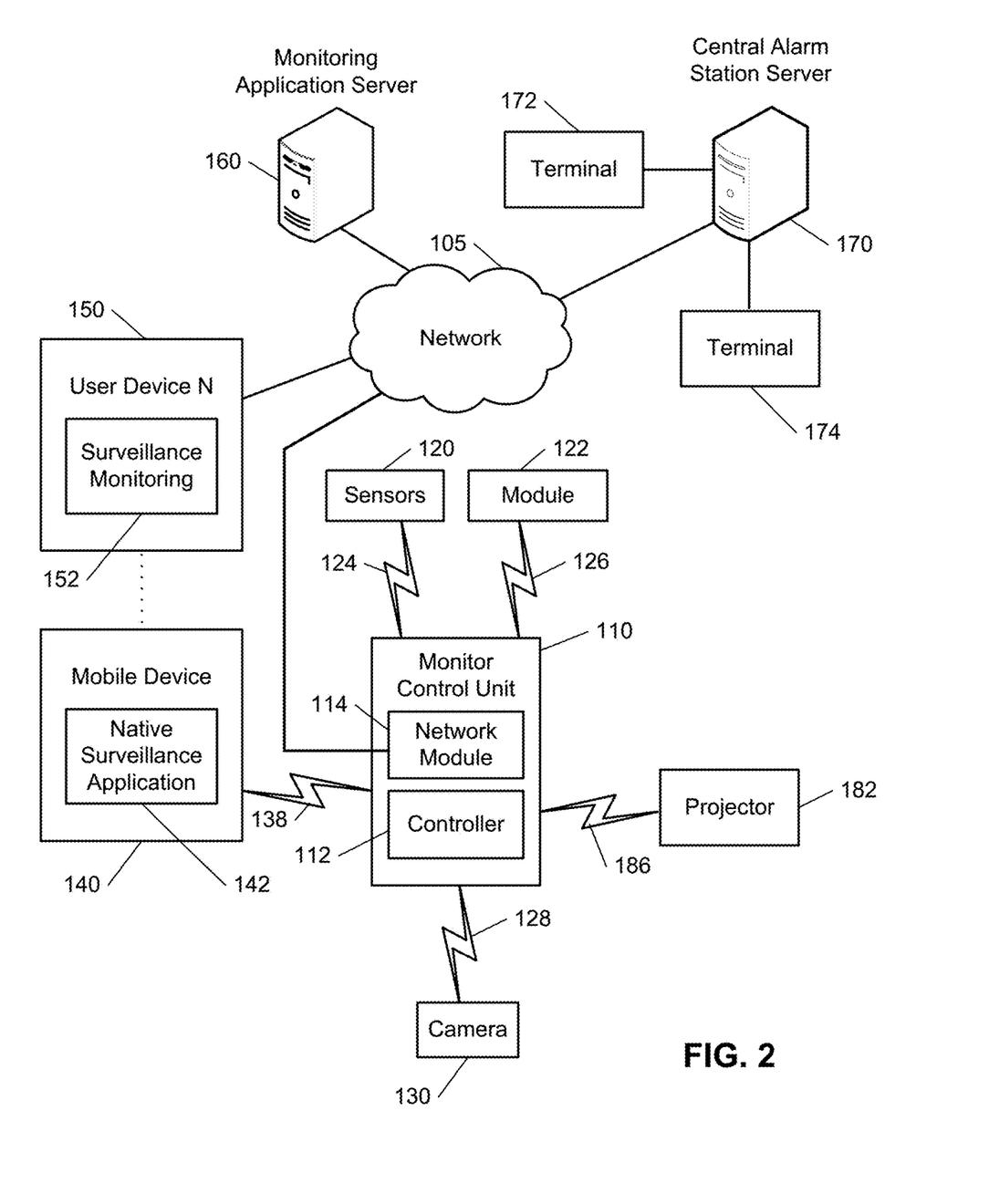
FIG. 2 illustrates an example system.

FIG. 2 illustrates an example of a system 200 configured to provide surveillance, reporting, and projecting light. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110. In some implementations, the camera 70 in FIGS. 1A-1B may be the camera 130.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, the projector 182, and the camera 130 communicate with the controller 112 over communication links 124, 126, and 128. The communication links 124, 126, and 128 may be a wired or wireless data pathway configured to transmit signals from the sensors 120, the module 122, the projector 182, and the camera 130 to the controller 112. The sensors 120, the module 122, the projector 182, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, the projector 182, and the camera 130. The one or more user devices 140, 150 receive data directly from the sensors 120, the module 122, the projector 182, and the camera 130 and sends data directly to the sensors 120, the module 122, the projector 182, and the camera 130. The one or more user devices 140, 150 provide the appropriate interfaces/processing to provide visual surveillance and reporting.

In other implementations, the system 200 further includes network 105 and the sensors 120, the module 122, the projector 182, and the camera 130 are configured to communicate sensor and image data to the one or more user devices 140, 150 over network 105 (e.g., the Internet, cellular network, etc.). In yet another implementation, the sensors 120, the module 122, the projector 182, and the camera 130 (or a component, such as a bridge/router) are intelligent enough to change the communication pathway from a direct local pathway when the one or more user devices 140, 150 are in close physical proximity to the sensors 120, the module 122, the projector 182, and the camera 130 to a pathway over network 105 when the one or more user devices 140, 150 are farther from the sensors 120, the module 122, the projector 182, and the camera 130. In some examples, the system leverages GPS information from the one or more user devices 140, 150 to determine whether the one or more user devices 140, 150 are close enough to the sensors 120, the module 122, the projector 182, and the camera 130 to use the direct local pathway or whether the one or more user devices 140, 150 are far enough from the sensors 120, the module 122, the projector 182, and the camera 130 that the pathway over network 105 is required. In other examples, the system leverages status communications (e.g., pinging) between the one or more user devices 140, 150 and the sensors 120, the module 122, the projector 182, and the camera 130 to determine whether communication using the direct local pathway is possible. If communication using the direct local pathway is possible, the one or more user devices 140, 150 communicate with the sensors 120, the module 122, the projector 182, and the camera 130 using the direct local pathway. If communication using the direct local pathway is not possible, the one or more user devices 140, 150 communicate with the sensors 120, the module 122, the projector 182, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring application server 160) may be configured to monitor a property and project an optical pattern at a site of the property based on video analytics or image processing. For instance, the system 200 may control a projector 182 of the property 10 to project an optical pattern (e.g., a warning sign or a guidance) at a site of the property based on identifying a moving object in the property by analyzing images and videos of the property 10. The system 200 may control the camera 130 and the projector 182 to track or follow the moving object.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of projecting light without having to send image/video data to a separate server separated by a network.

In other implementations, all of the processing described throughout this disclosure may be performed on a remote server (e.g., monitoring application server 160). In these implementations, the monitoring system control panel (or sensors themselves) may send image/video data to the remote server over a network and the remote server may perform all of projecting light. For instance, the monitoring system control unit 110 sends all captured image/video data to the monitoring application server 160 and the monitoring application server 160 performs the processing of projecting light and tracking an object.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 110 and the monitoring application server 160.

Figure 3:
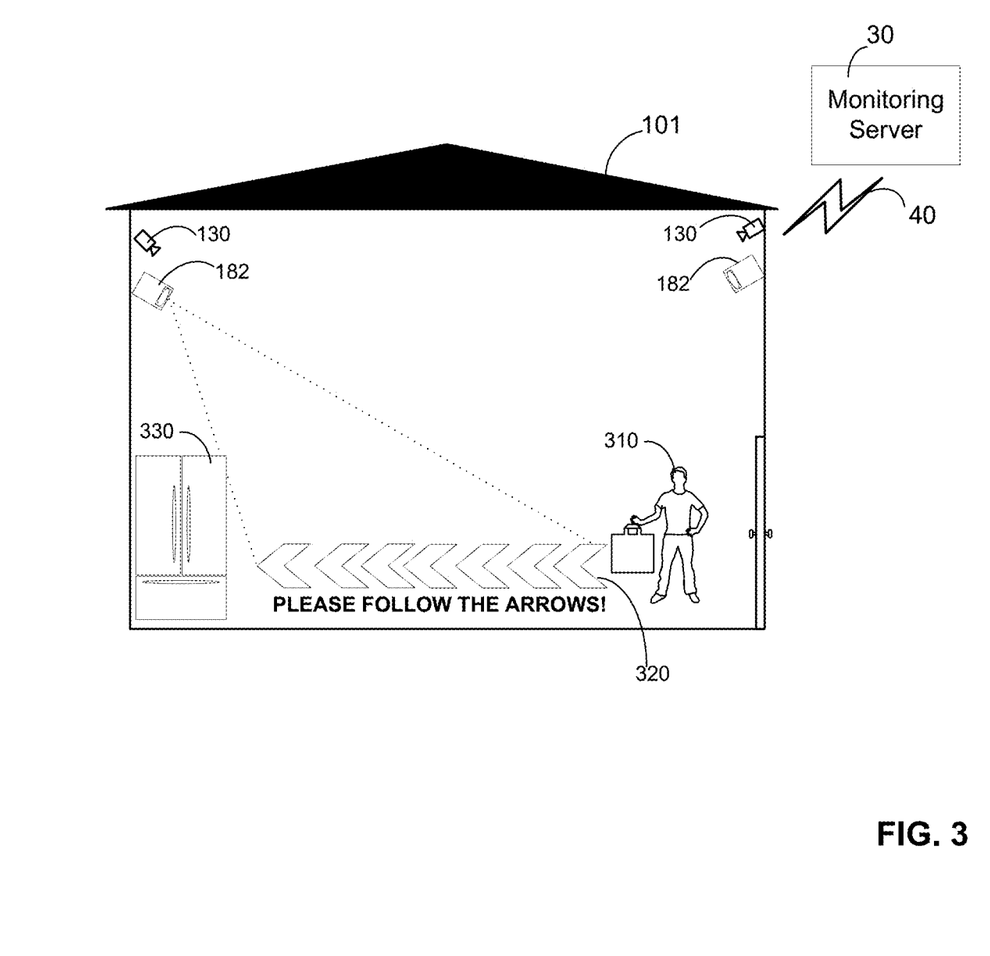
FIG. 3 illustrates a contextual diagram of an example system for projector assisted monitoring and guiding.

FIG. 3 illustrates a contextual diagram of an example system for projector assisted monitoring and guiding. As shown in FIG. 3, a property 101 (e.g., a house) is monitored by a system (e.g., in-home security system) that includes a monitoring server 30, cameras 130, projectors 182. The monitoring server 30 communicates with the cameras 130 and the projectors 182 through a communication link 40. The cameras 130 can view an indoor area of the property 101 to monitor events and a moving object 310. The moving object 310 may be a delivery person who has been prearranged by a user (e.g., a homeowner) to deliver perishable food such as meats, vegetables, and fruits into the refrigerator 330 located inside the property 101. The projector 182 can project multiple different types of optical patterns such as graphics and texts at the indoor area of the property 101.

For example, when a monitoring server 30 detects that a delivery person has arrived at the property 101 through image recognition on video from an outdoor camera, the monitoring server 30 may unlock a front door of the property 101 and provide an audio announcement that the front door is unlocked and that the delivery person should come in. Once inside, the monitoring server 30 may instruct the projector 182 to project an optical guidance pattern 320 to guide the delivery person to the refrigerator 330 by showing a projected optical path including arrows and texts "PLEASE FOLLOW THE ARROWS!".

The monitoring server 30 may monitor movement of the moving object 310 until the predetermined activities (e.g., delivery and storage) are completed and until the moving object 310 leaves the property 101. For example, while the delivery person moves, the monitoring server 30 may brighten arrows directly in front of the delivery person and stop projecting arrows behind a delivery person. In this example, the delivery person can see the changes in the arrows and know that the monitoring server 30 is closely tracking the delivery person.

Although the guidance pattern 320 is shown as a straight path for brevity, the guidance pattern may include multiple turns and may change directions toward to the door while guiding the moving object 310 to leave the property 101. In some cases, another projector can project another optical pattern on an area near the target refrigerator 330 or directly on the refrigerator 330 to indicate a destination to the human object 310.

In some examples, the moving object 310 may not follow the projected optical guidance pattern 320. In these cases, the monitoring server 30 may determine that the moving object 310 may be a potential threat based on similar operations described with an example in FIG. 1, and in response, the monitoring server 30 may transmit an alert to an operator's call center, or even local law enforcement that indicates that there may be a break-in at the property from which the alert originated. The projector assisted monitoring and guiding may be applicable to other examples such as guiding home maintenance personnel to a spot that needs a repair and guiding a visitor to a parking space. In some implementations, the monitoring system may be applicable to an interactive game that a user can interact with projected optical patterns by gestures, for instance.

Figure 4:
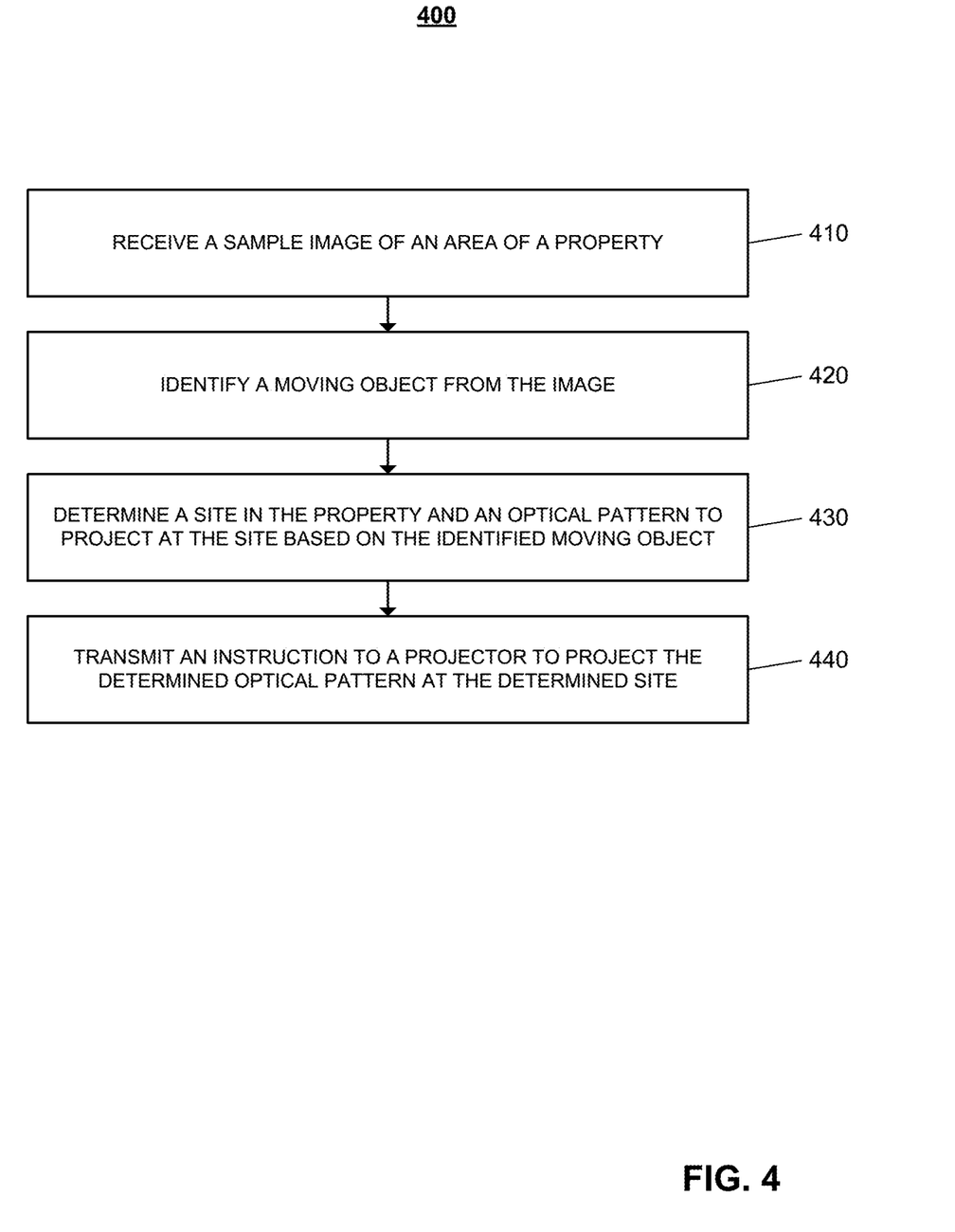
FIG. 4 is a flow chart of an example process for projecting an optical pattern based on detection of a moving object.

FIG. 4 illustrates an example process 400 for monitoring using a projector. The system 200 (in FIG. 2) receives a sample image of an area of a property captured by a monitoring system that monitors the property (410). For example, the system 200 receives, over a network 105, an image of an outdoor area or an indoor area captured by a camera 130 fixed at the property. In some examples, the system may project a reference optical pattern in the area using a projector. In these cases, the sample image may contain the reference optical pattern. In some cases, the system 200 may receive multiple images from one or more cameras 130. The system 200 may receive all images captured by the monitoring system, regardless of whether the monitoring system is in an armed state or an unarmed state.

The system 200 identifies a moving object in the area shown in the sample image (420). For instance, the system 200 identifies the moving object based on video analytics with the sample image such as face recognition using other available data to the system 200 such as predetermined visitors' appearance data. In some examples, the system 200 may have established a pre-map or a three-dimensional map corresponding to the property using projectors that project a reference optical pattern and cameras that capture images containing the reference optical pattern. The pre-map may include three-dimensional information about various areas of the property. Based on the reference optical pattern in the sample image showing a difference from the pre-map of the property, the system 200 may determine that a moving object may exist in the property.

In some implementations, the system 200 may utilize information regarding known users of the property to identify the moving object from the sample image. For example, the system 200 obtains information regarding known users of the property. The information may include a plurality of images or appearance information of family members, service providers (e.g., deliverymen), and other registered users in the system 200. For example, the homeowner may input a list of family members and corresponding photographs of the family members during a setup of the system 200. Alternatively or in addition, the system 200 may learn the information regarding the known users. For instance, the system 200 determines a person who disarms the property for one or more times as a known user, and captures and stores an image of the person. In some cases, the homeowner may provide additional input to confirm the person is actually a known user of the property.

The system 200 may determine that the moving object corresponds to an unknown user based on determining that the moving object in the sample image does not match the information regarding the known users. For example, if the moving object's appearance (e.g., face, body shape, hairstyle, clothes, etc.) shown in the sample image does not match one of the known users' appearance included in the information, the system 200 may determine that the moving object corresponds to an unknown user. The unknown user may be a potential intruder on the property. In some cases, the unknown user may be a new service provider that is not included in the information regarding known users.

In some implementations, when the system 200 determines that the moving object corresponds to the unknown user, the system 200 may transmit an instruction to the projector to project a warning optical pattern to a location nearby the moving object. The location nearby the moving object may be an area surrounding the moving object, an area in front of the moving object, or any other areas where the moving object can recognize that he/she is being watched. The system 200 may track movement of the moving object, and transmit an instruction to the projector to project the optical pattern at a new location or an expected location of the moving object based on movement of the moving object. For instance, if the moving object is approaching the property, the projector may project the optical pattern at a front door area where the moving object is expected to move next.

The system 200 determines a site in the property and an optical pattern to project at the site based on the identified moving object (430). For example, if the system 200 has identified the moving object is a potential threat (e.g., an intruder), the system 200 may determine to project a warning message in an optical shape surrounding the moving object at a ground where the moving object stands. If the system 200 has identified the moving object is a prearranged person such as a delivery person, the system 200 may project a guidance optical pattern such as arrows and instruction messages in front of the moving object.

In some implementations, the system 200 may include two or more steps corresponding to the step 430. For example, the system 200 determines a site in the property based on the identified moving object, and then determines an optical pattern to project at the site based on the identified moving object. In other examples, the system 200 may determine an optical pattern to project based on the identified moving object, and then determines a site in the property to project the optical pattern based on the identified moving object. In some examples, these independent steps may be performed simultaneously.

The system 200 transmits an instruction to a projector to project the determined optical pattern at the determined site in the property (440). In some examples, the system 200 may transmit an instruction to multiple cameras so that the moving object is monitored from various angles. The system 200 may repeat the process 400 to track the moving object. For instance, when the moving object moves from a first site to a second site in the property, the system 200 controls cameras to capture images of the second site and transmits an instruction to the projector to project a new warning or guiding optical pattern at the second site based on the identification of the moving object. The optical pattern may include various types of projection such as a point, a projection line, a shape, text, a graphical object, a photograph of the moving object, a video of the moving object, and pulsed light.

Figure 5:
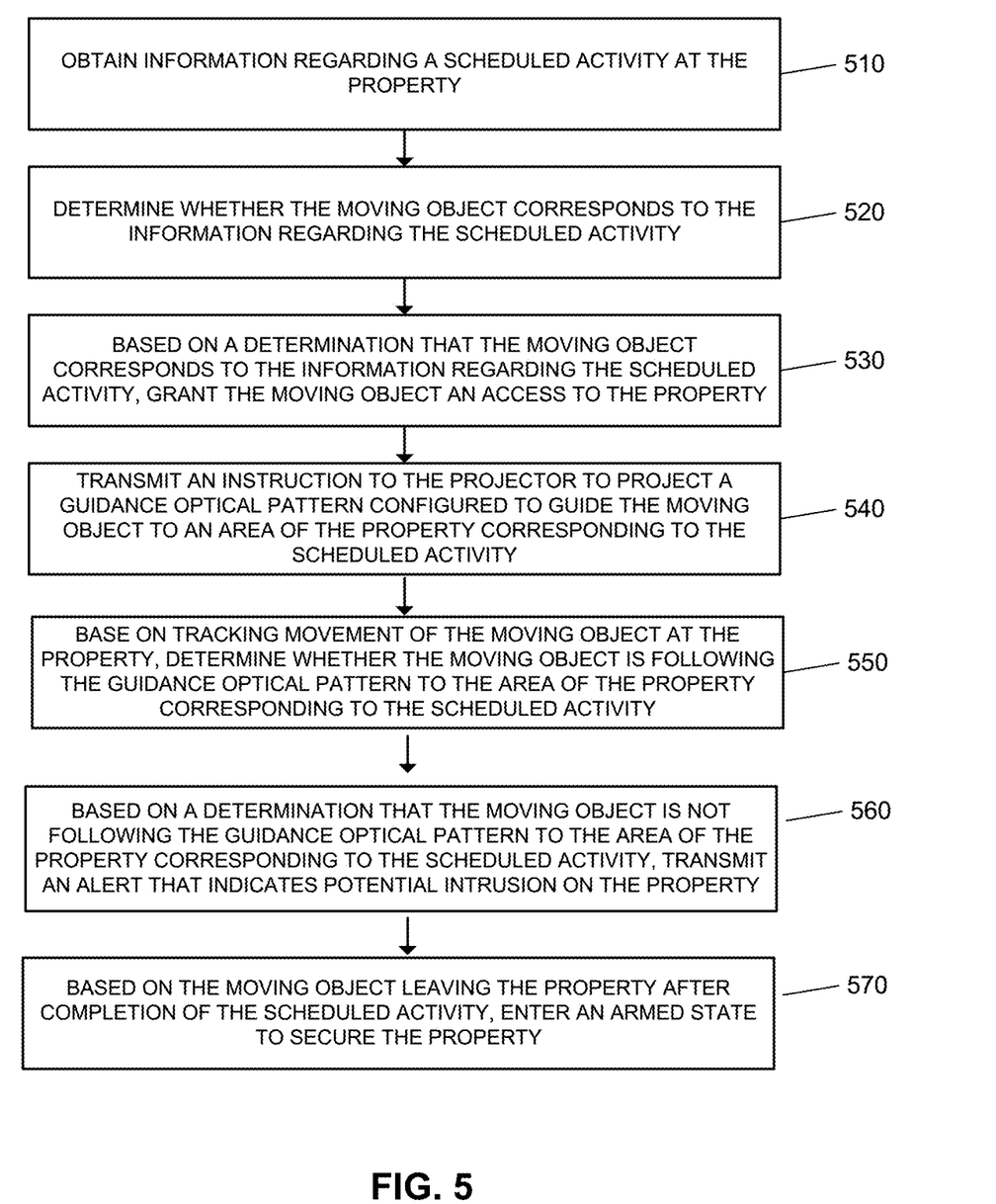
FIG. 5 is a flow chart of an example process for providing guidance to a moving object using an optical pattern.

FIG. 5 illustrates an example process for providing guidance to a moving object using an optical pattern. In this example, the moving object corresponds to a scheduled activity such as delivery of a package to a property. In some implementations, the system 200 may utilize information regarding the scheduled activity at the property to identify the moving object from the sample image. For instance, the scheduled activity may include deliveries, home maintenance works (e.g., lawn mowing, tree trimming), scheduled repair works (e.g., plumbing), dog walks, etc. The information regarding the scheduled activity may specify appearances (e.g., faces, uniforms) of service providers, expected arrival and departure times of the service providers, and expected areas in the property for performance of the scheduled activity.

The system 200 obtains information regarding a scheduled activity at the property (510). For example, the system 200 may obtain the information regarding the scheduled activity from the user (e.g., emails sent to the user), service providers (e.g., internet merchants), or other remote servers. In some cases, the user may input the scheduled activity using a user device connected to the system 200 such as a computer, a mobile device, and a control panel of the system 200.

The system 200 determines whether the moving object corresponds to the information regarding the scheduled activity (520). In a simple example, the system 200 may determine whether the delivery person arrived at the property within a scheduled time window. If the system 200 determines the delivery person arrived at the property outside of the scheduled time window, the system 200 may determine the delivery person does not correspond to the information regarding the scheduled activity. In other examples, if the system 200 detects a delivery person present at a restricted area (e.g., closets, bedrooms) of the property, the system 200 may determine the delivery person does not correspond to the information regarding scheduled activity that specifies a front door area or an area nearby a mailbox as an expected area for the delivery person.

In some implementations, the system 200 may grant the moving object access to the property based on a determination that the moving object corresponds to the information regarding the scheduled activity (530). For example, when a delivery person arrives at a front door of the property, the system 200 captures an image of the delivery person and determines an arrival time of the delivery person. If the appearance of the delivery person in the captured image and the arrival time corresponds to the delivery schedule, the system 200 may unlock the front door and/or disarm the property for the delivery person to put a mail or package at an inside of the property according to the delivery schedule that specifies a delivery location inside of the property. In some cases, the projector may project an optical pattern at the delivery location for the delivery person to recognize the correct delivery location.

In some implementations, the system 200 may transmit an instruction to the projector to project a guidance optical pattern configured to guide the moving object to an area of the property corresponding to the scheduled activity (540). For example, the scheduled activity may be to deliver fresh vegetables and store in a refrigerator located in a kitchen of the property. In the example shown in FIG. 3, the projector may project a guidance optical pattern such as arrows, messages, and blinking light that can assist a delivery person to find the refrigerator located in the kitchen of the property.

In some implementations, the system 200 may determine whether the moving object is following the guidance optical pattern to the area of the property corresponding to the scheduled activity based on tracking movement of the moving object at the property (550). For example, the system 200 tracks activities and locations of the moving object by using one or more cameras and one or more sensors that are installed at the property. In the in-home delivery example described above, the system 200 may determine that the delivery person is following the guidance optical pattern if a distance between the guidance optical pattern and the delivery person is within a threshold distance. For example, the system 200 determines a distance from a foot of the moving object to an edge of the guidance optical pattern projected on the floor.

In some implementations, the system 200 may transmit an alert that indicates potential intrusion on the property based on a determination that the moving object is not following the guidance optical pattern to the area of the property corresponding to the scheduled activity (560). For example, if the distance between the centerline of the guidance optical pattern and the delivery person is greater than the threshold distance, the system 200 may send an alert indicating potential intrusion on the property. The alert may be a call or text to a security service provider, police, or the homeowner, for instance. In some cases, the alert may be a loud sound that may deter the moving object from intruding the property and that may help people to locate the property indicating the potential intrusion.

In some implementations, the system 200 may enter an armed state to secure the property based on the moving object leaving the property after completion of the scheduled activity (570). In some examples, the system 200 tracks activities and locations of the moving object using one or more cameras and one or more sensors. For example, when a delivery person corresponding to a scheduled delivery closes a front door or leaves a front porch after delivering the mail or package to a delivery location (e.g., an inside of the property), the system 200 may determine that the scheduled delivery has been complete and secure the property by entering an armed state. For example, the system 200 may activate event detection and notification functions of the system.

Figure 6A:
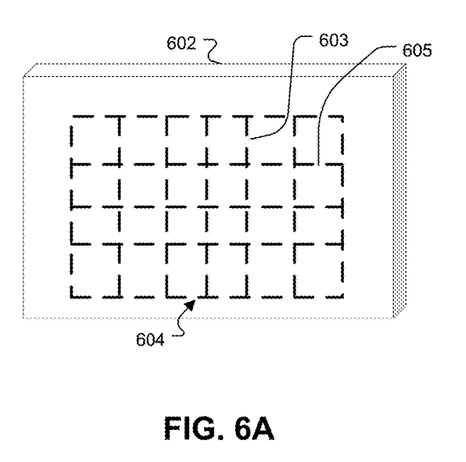
FIGS. 6A to 6C illustrate example optical patterns projected to example areas of a property.
Figure 6B:
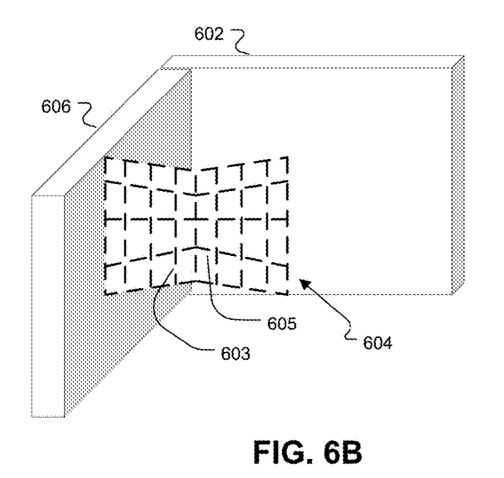
Figure 6C:
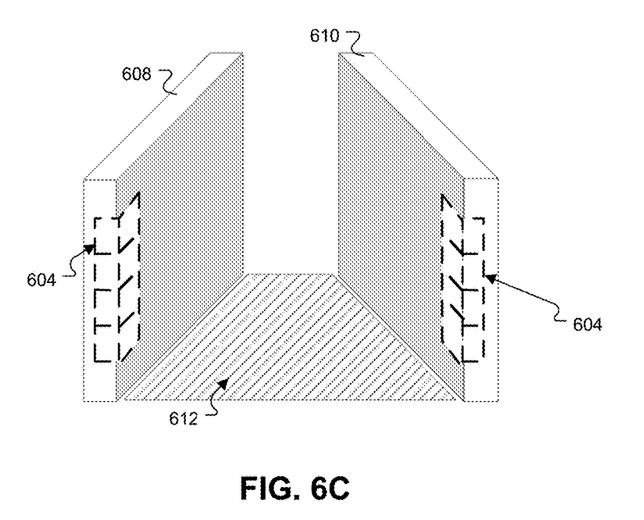

FIGS. 6A to 6C illustrate example reference optical patterns projected to a plurality of areas of the property. For example, the plurality of areas of the property may be interior walls 602, 606, 608, and 610 and a hallway 612. FIG. 6A illustrates a grid pattern 604 projected on a flat wall 602. FIG. 6B illustrates a grid pattern 604 projected to a corner area between walls 602 and 606. FIG. 6C illustrates a grid pattern 604 projected to a hallway 612 of the property.

The projector may project, to the plurality of areas, one or more reference optical patterns such as the grid pattern 604 that includes vertical grid lines 603 and horizontal grid lines 605. The vertical grid lines 603 may be spaced apart from each other by one or more predetermined distances, and the horizontal grid lines 605 may be spaced apart from each other by one or more predetermined distances. The grid lines 603 and 605 in this example are orthogonal to each other, but other types of grid patterns and other orientations of the grid lines are possible. For example, the grid pattern 604 may include grid lines or grid curves that extend toward three or more directions (e.g., three directions separated by 120 degrees from each other).

Referring to FIG. 6A, the projected grid pattern 604 on the flat wall 602 forms a replication of the grid pattern, and has regular distances between the grid lines. In some cases, an overall size of the projected grid pattern 604, distances between grid lines 603, and distances between grid lines 605 may change based on a distance from the projector and the wall 602. Based on the shape of the projected grid pattern 604, the system 200 may determine that the wall 602 is flat.

Referring to FIG. 6B, the grid pattern 604 projected to a corner between the walls 602 and 606 forms a deformed grid pattern that has a different shape than a shape of the original grid pattern. Based on the deformed shape of projected grid pattern 604, the system 200 may determine the area shown in FIG. 6B corresponds to a corner between the two walls. For example, the horizontal grid lines 605 may extend in an inclined direction with respect to the floor, and distances between the horizontal grid lines 605 may decrease toward the corner (i.e., the interface) of the walls 602 and 606. The vertical grid lines 603 may have different lengths from each other, where an overall shape of the grid pattern 604 is different than a rectangular shape of the grid pattern seen in FIG. 6A. In some cases, one or more projected grid lines may be curved due to diffraction from structures (e.g. walls 602, 606) in the property.

Referring to FIG. 6C, the grid pattern 604 is projected to a hallway 612 between two walls 608 and 610. In this example, only a portion(s) of the grid pattern is formed on a surface one or both of the walls 608 and 610 because the hallway 612 is an open space where the grid pattern 604 cannot be fully formed. Based on existence of the projected grid pattern 604 at the walls 608 and 610 and lack of the projected grid pattern 604 at the hallway 612, the system 200 may determine the area shown in FIG. 6C corresponds to a hallway or an open space between two walls.

Figure 7:
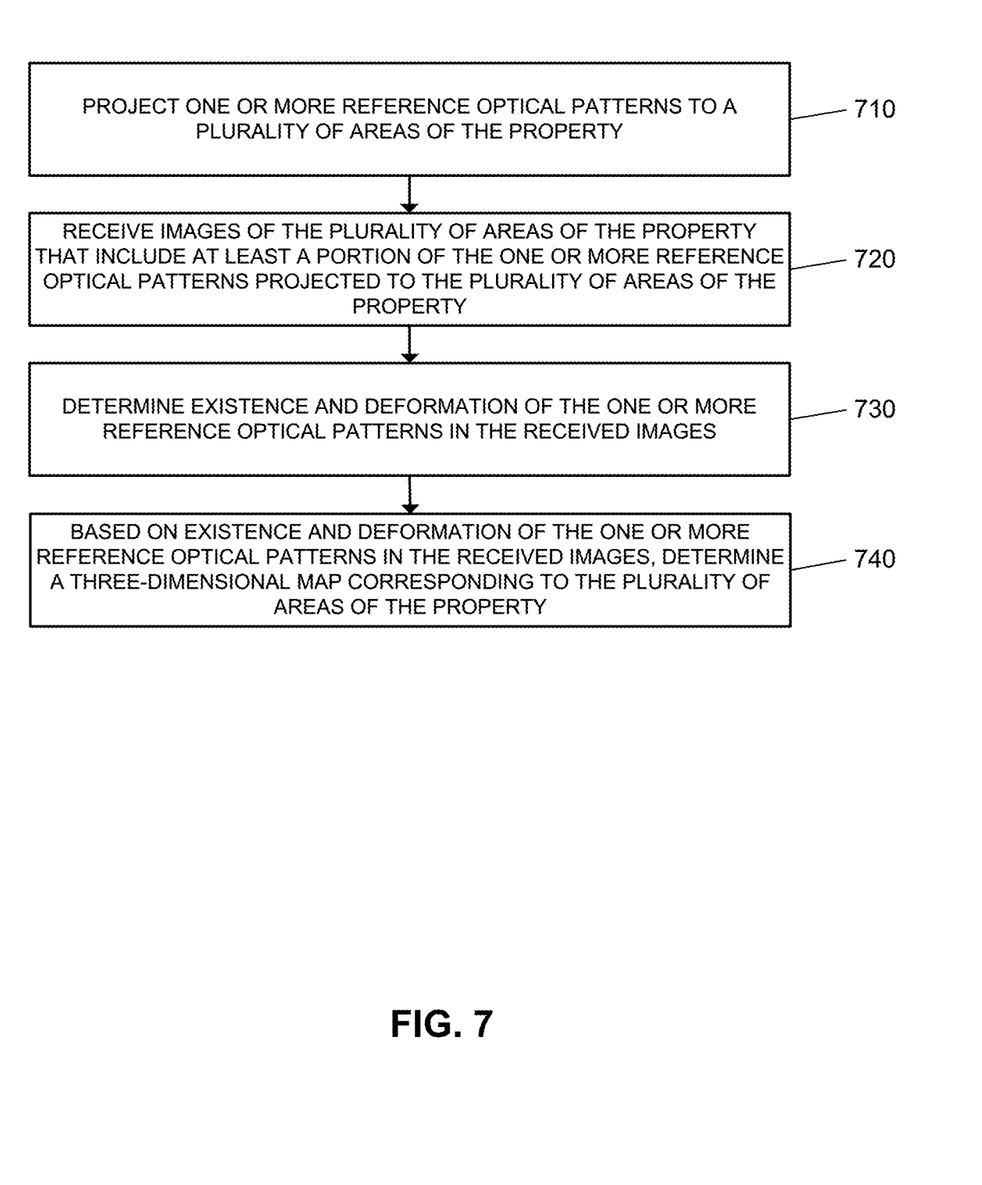
FIG. 7 is a flow chart of an example process for determining a three-dimensional map corresponding to multiple areas of a property.

FIG. 7 illustrates an example process for determining a three-dimensional map corresponding to multiple areas of a property.

The system 200 may project one or more reference optical patterns to a plurality of areas of the property (710). For example, the one or more reference patterns may be visible light patterns or infrared light patterns including a grid pattern defined by grid lines spaced apart from each other by a predetermined distance (see FIGS. 6A to 6C). In some examples, the system 200 may transmit instructions to one or more projectors to project the grid pattern to the one or more areas of the property such as walls, rooms, and hallways, etc. In some examples, one or more projectors installed at different locations of the property may project one grid pattern in multiple different directions to collect images of the grid pattern from the multiple directions.

The system 200 may receive images of the plurality of areas of the property that include at least a portion of the one or more reference optical patterns projected to the plurality of areas of the property (720). For example, the system 200 may include one or more cameras to capture images of the one or more reference optical patterns that are projected onto the plurality of areas of the property.

The system 200 may determine existence and deformation of the one or more reference optical patterns in the received images (730). For example, the projected grid pattern shown in the images may be deformed by diffraction of light due to structures positioned at the areas of the property. In this case, the project grid lines of the grid pattern may be bent, or the distances between the grid lines may be increased or decreased from the predetermined distance (see FIG. 6B). In some cases, a portion of or entire grid pattern may be missing in the images due to structures at the areas that block propagation of light (see FIG. 6C). In some cases, a portion of grid pattern may be missing in the image when the grid pattern is formed at an area outside of a field of view of the one or more cameras. For example, when the projector projects the grid pattern to a corner area, a portion of the grid pattern may be formed at a surface of the corner, but some portion of the grid pattern may be formed at a surface of a different wall located outside of a field of view of one or more cameras.

The system 200 may determine a three-dimensional map corresponding to the plurality of areas of the property based on existence and deformation of the one or more reference optical patterns in the received images (740). Various analysis methods are possible to determine a three-dimensional map corresponding to the plurality of areas of the property. For example, based on distances or angles between grid lines and curvature of the grid lines shown in the images, the system 200 may determine that the area in the images corresponds to a corner area of the property. In some cases, the system 200 may determine a shape of the area (e.g., a round corner, a sharp corner). In other examples, based on the grid pattern partially or entirely missing from the images, the system 200 may determine a hallway of the property. Other analysis methods are available to determine a three-dimensional map based on two-dimensional images. In some implementations, the three-dimensional map may serve as a reference map to determine a location of the moving object in the property, and facilitate tracking the moving object with multiple cameras.

In some implementations, the system 200 may receive a plurality of images of the moving object. For example, the system 200 may receive a first image at a first time instant and a second image at a second time instant, where the second time instant is after the first time instant. The system 200 may determine, based on the plurality of images, whether the moving object is approaching toward the property. For example, the system 200 may determine a distance between the moving object and the property corresponding to each of the plurality of images. For instance, the system 200 receives the first and second images at the first and second time instants. Then, the system 200 determines the moving object is approaching the property if a second distance corresponding to the second image is less than a first distance corresponding to the first image.

In some implementations, the system 200 may transmit an instruction to the projector to increase brightness of projection of the optical pattern based on a determination that the moving object is approaching toward the property. For example, the projector may increase brightness of projection based on amplification of power supplied to the projector or based on changing one or more optical settings of the projector (e.g., lens, attenuator, iris, magnification, etc.). As the moving object is approaching the property closer, the moving object may recognize the optical pattern getting brighter. In some cases, the moving object realizes, from the optical pattern that gets brighter, that the system is actively monitoring the moving object and gives up an intention for intruding the property.

In some implementations, the property 101 may equip with multiple cameras and/or multiple projectors to further enhance the monitoring system with a wider coverage and higher accuracy in determining a location for projection. In these cases, calibration and synchronization between the cameras, between projectors, and between the cameras and the projectors becomes more important for an accurate monitoring. The projectors can also assist in these calibrations and synchronizations across multiple cameras and projectors.

For example, the multiple cameras may have different capturing speeds, different processing speeds, and different transmission time so that the video being received from one camera may not match in time with a video received at the same time from another camera. Additionally, in some cases, the multiple cameras may have different set clock times. The multiple cameras having mismatches in time may respond to the monitoring server inaccurately. The mismatches in time may be seconds, minutes, hours, days, months, and even years. As an example method to synchronize multiple cameras, the monitoring server may transmit an instruction to project pulsed light or a sequence of patterns with a predetermined frequency onto an area where the multiple cameras can view. By analyzing the images or videos of the area including the pulsed light captured by the multiple cameras, the monitoring server may determine a timing of each camera such as a capturing speed, a processing speed, and a transmission time. The monitoring server may synchronize the timing of each camera to a reference timing corresponding to the predetermined frequency of the pulsed light.

In some implementations, the monitoring system may further calibrate the cameras using a projector for a spatial calibration. For instance, the projector may project a reference pattern such as a grid, a line, or an alignment mark onto a shared area that multiple cameras can view at the same time from different angles. Based on recognition of the reference pattern in multiple images captured by the multiple cameras, the monitoring system may "stitch" the multiple images and generate continuous images of multiple areas captured from various angles. In addition, once the cameras are spatially calibrated as such, they can be used as a stereo camera pair, and the monitoring system may extract depth information and three-dimensional structure of objects based on the disparity between the cameras.

In some examples, the monitoring system may operate only a subset of the multiple cameras and projectors based on the determined location of a moving object. For example, only three cameras and projectors that are close to the moving object may be activated to efficiently monitor and track the moving object. In this case, the other cameras and projectors may keep monitoring other areas.

In some implementations, the monitoring system may enable an interactive operation of the projector for a user to view a predetermined a reference optical pattern such as optical "tripwires" or a projected mesh. In some cases, the user may be also allowed to define and adjust the optical tripwires by performing predetermined gestures in an area where a camera can view. In response, the projector may project updated current optical tripwires in the area. Alternatively or additionally, the interactive operation of a reference optical pattern can be done using a user interface such as a mobile device and a website. In some examples, the optical or virtual tripwires may be defined at an outdoor area with projected glowing red lines surrounding the property, for instance, that can be activated based on the monitoring system determining that an object approaches to the property.

In some implementations, the monitoring system may highlight a specific spot in a property based on determining that the specific spot may require an attention of a user. For example, the monitoring system may recognize, by monitoring areas with projected optical reference patterns, new objects at the property such as a package delivered at a door, a water puddle in a driveway, a mole ditch in a backyard, and any kind of unusual objects. In some examples, the projector may project a focus light or a visual guide, for instance, to the new objects so that the user can easily find the new objects.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    receiving, from a camera, a sample image of an area of a property that includes at least one of a building or a house;
    identifying a moving object from the sample image;
    determining a site in the property based on the identified moving object;
    determining an optical pattern to project at the site based on the identified moving object; and
    transmitting an instruction to a projector to project the determined optical pattern at the determined site,
    wherein identifying the moving object from the sample image comprises:
        obtaining information regarding a scheduled activity at the property; and
        determining whether the moving object corresponds to the information regarding the scheduled activity, and
    wherein transmitting the instruction to the projector comprises transmitting an instruction to the projector to project a guidance optical pattern configured to guide the moving object to move to an area of the property corresponding to the scheduled activity.

2. The method of claim 1, wherein identifying the moving object from the sample image comprises:
    obtaining information regarding known users of the property; and
    determining the moving object corresponds to an unknown user based on the moving object in the sample image does not match the information regarding the known users.

3. The method of claim 2, wherein transmitting the instruction to the projector comprising transmitting an instruction to the projector to project a warning optical pattern to a location nearby the moving object based on a determination the moving object corresponds to the unknown user.

4. The method of claim 1, wherein identifying the moving object from the sample image further comprises granting the moving object access to the property based on a determination that the moving object corresponds to the information regarding the scheduled activity.

5. The method of claim 1, wherein identifying the moving object from the sample image further comprises entering an armed state to secure the property based on the moving object leaving the property after completion of the scheduled activity.

6. The method of claim 1, further comprising:
    tracking movement of the moving object at the property;
    based on tracking movement of the moving object at the property, determining whether the moving object is following the guidance optical pattern to the area of the property corresponding to the scheduled activity; and
    based on a determination that the moving object is not following the guidance optical pattern to the area of the property corresponding to the scheduled activity, transmitting an alert that indicates potential intrusion on the property.

7. The method of claim 1, further comprising:
    receiving a plurality of images of the moving object;
    based on the plurality of images, determining whether the moving object is approaching toward the property; and
    based on a determination that the moving object is approaching toward the property, transmitting an instruction to the projector to increase brightness of projection of the optical pattern.

8. The method of claim 1, further comprising:
    projecting one or more reference optical patterns to a plurality of areas of the property;
    receiving images of the plurality of areas of the property that include at least a portion of the one or more reference optical patterns projected to the plurality of areas of the property;
    determining existence and deformation of the one or more reference optical patterns in the received images; and based on existence and deformation of the one or more reference optical patterns in the received images of the plurality of areas of the property, determining a three-dimensional map corresponding to the plurality of areas of the property.

9. The method of claim 1, wherein the optical pattern comprises at least one of a point, a projection line, a shape, text, a graphical object, a photograph of the moving object, a video of the moving object, or pulsed light.

10. The method of claim 1, wherein determining the optical pattern comprises:
based on the identified moving object, selecting data corresponding to the optical pattern from a predetermined data set that includes information corresponding to a plurality of optical patterns.

11. A system for projector-assisted monitoring, the system comprising:
a camera installed at a property and configured to capture an image of an area of the property;
a projector that is installed at the property and that is configured to project an optical pattern to the area of the property; and
at least one controller configured to perform operations comprising:
receiving, from the camera, a sample image of an area of a property,
identifying a moving object from the sample image,
determining a site in the property based on the identified moving object,
determining an optical pattern to project at the site based on the identified moving object, and
transmitting an instruction to a projector to project the determined optical pattern at the determined site,
wherein identifying the moving object from the sample image comprises:
obtaining information regarding a scheduled activity at the property; and
determining whether the moving object corresponds to the information regarding the scheduled activity, and
wherein transmitting the instruction to the projector comprises transmitting an instruction to the projector to project a guidance optical pattern configured to guide the moving object to move to an area of the property corresponding to the scheduled activity.

12. The system of claim 11, wherein the operations further comprise:
tracking movement of the moving object at the property;
based on tracking movement of the moving object at the property, determining whether the moving object is following the guidance optical pattern to the area of the property corresponding to the scheduled activity; and
based on a determination that the moving object is not following the guidance optical pattern to the area of the property corresponding to the scheduled activity, transmitting an alert that indicates potential intrusion on the property.

13. The system of claim 11, wherein the operations further comprise:
receiving a plurality of images of the moving object;
based on the plurality of images, determining whether the moving object is approaching toward the property; and
based on a determination that the moving object is approaching toward the property, transmitting an instruction to the projector to increase brightness of projection of the optical pattern.

14. The system of claim 11, wherein the operations further comprise:

projecting one or more reference optical patterns to a plurality of areas of the property;
receiving images of the plurality of areas of the property that include at least a portion of the one or more reference optical patterns projected to the plurality of areas of the property;
determining existence and deformation of the one or more reference optical patterns in the received images; and
based on existence and deformation of the one or more reference optical patterns in the received images of the plurality of areas of the property, determining a three-dimensional map corresponding to the plurality of areas of the property.

15. At least one non-transitory computer-readable storage medium having stored thereon instructions which, when executed by at least one processor, cause performance of operations comprising:
receiving, from a camera, a sample image of an area of a property that includes at least one of a building or a house;
identifying a moving object from the sample image;
determining a site in the property based on the identified moving object;
determining an optical pattern to project at the site based on the identified moving object; and
transmitting an instruction to a projector to project the determined optical pattern at the determined site,
wherein identifying the moving object from the sample image comprises:
obtaining information regarding a scheduled activity at the property; and
determining whether the moving object corresponds to the information regarding the scheduled activity, and
wherein transmitting the instruction to the projector comprises transmitting an instruction to the projector to project a guidance optical pattern configured to guide the moving object to move to an area of the property corresponding to the scheduled activity.

16. The at least one non-transitory computer-readable storage medium of claim 15, wherein the operations further comprise:
tracking movement of the moving object at the property;
based on tracking movement of the moving object at the property, determining whether the moving object is following the guidance optical pattern to the area of the property corresponding to the scheduled activity; and
based on a determination that the moving object is not following the guidance optical pattern to the area of the property corresponding to the scheduled activity, transmitting an alert that indicates potential intrusion on the property.

17. The at least one non-transitory computer-readable storage medium of claim 15, wherein the operations further comprise:
receiving a plurality of images of the moving object;
based on the plurality of images, determining whether the moving object is approaching toward the property; and
based on a determination that the moving object is approaching toward the property, transmitting an instruction to the projector to increase brightness of projection of the optical pattern.

18. The at least one non-transitory computer-readable storage medium of claim 15, wherein the operations further comprise:
projecting one or more reference optical patterns to a plurality of areas of the property;

receiving images of the plurality of areas of the property that include at least a portion of the one or more reference optical patterns projected to the plurality of areas of the property;

determining existence and deformation of the one or more reference optical patterns in the received images; and based on existence and deformation of the one or more reference optical patterns in the received images of the plurality of areas of the property, determining a three-dimensional map corresponding to the plurality of areas of the property.

19. The at least one non-transitory computer-readable storage medium of claim 15, comprising:

a predetermined data set that includes information corresponding to a plurality of optical patterns, wherein determining the optical pattern comprises:

based on the identified moving object, selecting data corresponding to the optical pattern from the predetermined data set.

* * * * *